US011643111B2

(12) United States Patent
Choi et al.

(10) Patent No.: US 11,643,111 B2
(45) Date of Patent: May 9, 2023

(54) METHOD FOR CONTROLLING EMERGENCY STOP OF AUTONOMOUS VEHICLE

(71) Applicants: HYUNDAI MOTOR COMPANY, Seoul (KR); KIA MOTORS CORPORATION, Seoul (KR)

(72) Inventors: Eun Young Choi, Seoul (KR); Jin Su Jeong, Suwon-si (KR); Ki Seok Seong, Cheonan-si (KR); Min Sang Yu, Hwaseong-si (KR); Hyeong Jin Ham, Seongnam-si (KR); Rosali Sun Pyun, Seongnam-si (KR); Dong Il Yang, Seoul (KR); Woo Jin Kim, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 271 days.

(21) Appl. No.: 17/024,087

(22) Filed: Sep. 17, 2020

(65) Prior Publication Data

US 2021/0362746 A1 Nov. 25, 2021

(30) Foreign Application Priority Data

May 25, 2020 (KR) .................... 10-2020-0062221

(51) Int. Cl.
*B60W 60/00* (2020.01)
*B60W 50/14* (2020.01)
*G08G 1/127* (2006.01)

(52) U.S. Cl.
CPC ........ *B60W 60/0016* (2020.02); *B60W 50/14* (2013.01); *G08G 1/127* (2013.01); *B60W 2420/42* (2013.01); *B60W 2554/402* (2020.02); *B60W 2554/404* (2020.02); *B60W 2556/45* (2020.02)

(58) Field of Classification Search
CPC ....... B60W 50/14; B60W 60/00; G08G 1/127
See application file for complete search history.

(56) References Cited

U.S. PATENT DOCUMENTS

| 2014/0078304 A1* | 3/2014 | Othmer | H04L 63/302 |
| | | | 348/148 |
| 2016/0112461 A1* | 4/2016 | Othmer | H04L 63/102 |
| | | | 726/29 |
| 2017/0113688 A1* | 4/2017 | Nakatsuka | B60W 50/14 |

(Continued)

FOREIGN PATENT DOCUMENTS

CN 105938657 A * 9/2016 ....... G08G 1/096725

OTHER PUBLICATIONS

Machine translation of CN-105938657-A (Year: 2016).*

*Primary Examiner* — Mahmoud S Ismail
*Assistant Examiner* — Gabriel Anfinrud
(74) *Attorney, Agent, or Firm* — Morgan, Lewis & Bockius LLP

(57) ABSTRACT

A method for controlling emergency stop of an autonomous vehicle is provided. The method includes: controlling emergency stop of an autonomous vehicle capable of recognizing a stop request from an emergency vehicle, determining whether a current situation is an emergency situation or a general situation, and performing a procedure corresponding to each situation to stop the autonomous vehicle based on each situation.

12 Claims, 7 Drawing Sheets

(56) References Cited

U.S. PATENT DOCUMENTS

| | | | | |
|---|---|---|---|---|
| 2017/0364069 A1* | 12/2017 | Colella | .................. | H04W 4/02 |
| 2018/0113457 A1* | 4/2018 | Iagnemma | ............ | B60W 30/00 |
| 2018/0281817 A1* | 10/2018 | Ravichandran | ....... | B60W 50/14 |
| 2019/0126942 A1* | 5/2019 | Goto | ..................... | B60W 10/20 |
| 2019/0291728 A1* | 9/2019 | Shalev-Shwartz | ........................... B60W 30/0956 | |
| 2020/0276973 A1* | 9/2020 | Meijburg | ............... | G08G 1/087 |

* cited by examiner

METHOD FOR CONTROLLING EMERGENCY STOP OF AUTONOMOUS VEHICLE

CROSS-REFERENCE TO RELATED APPLICATION

The present application claims priority to and the benefit of Korean Patent Application No. 10-2020-0062221, filed on May 25, 2020, which is incorporated herein by reference in its entirety.

TECHNICAL FIELD

The present disclosure relates to a technology for controlling emergency stop of an autonomous vehicle in response to a request from an emergency vehicle.

BACKGROUND

The statements in this section merely provide background information related to the present disclosure and may not constitute prior art.

In general, an autonomous vehicle controls various systems in the vehicle including a steering device to recognize a road environment by itself, determine a traveling situation, and move from a current location to a target location along a planned traveling path.

Such autonomous vehicle may include an autonomous emergency braking (AEB), a forward collision warning system (FCW), an adaptive cruise control (ACC), a lane departure warning system (LDWS), a lane keeping assist system (LKAS), a blind spot detection (BSD), a rear-end collision warning system (RCW), a smart parking assist system (SPAS), and the like.

A passenger transportation service, a cargo transportation service, and the like using such autonomous vehicle are being developed.

A method for stopping the autonomous vehicle when the autonomous vehicle, which is a property of a business owner, is requested to stop from an emergency vehicle during travel has not been discussed so far. In one example, in a case of a privately owned autonomous vehicle, an owner (an occupant) may determine whether to stop. However, in a case of the autonomous vehicle, which is the property of the business owner, an additional procedure is required because the occupant is a customer from a business owner's point of view.

The matters described in this background art part are written to improve the understanding of the background of the invention, and may include matters other than the prior art already known to those skilled in the art to which this technology belongs.

SUMMARY

An aspect of the present disclosure provides a method for controlling emergency stop of an autonomous vehicle capable of recognizing a stop request from an emergency vehicle, determining whether a current situation is an emergency situation or a general situation, and performing a procedure corresponding to each situation to stop the autonomous vehicle based on each situation.

The technical problems to be solved by the present inventive concept are not limited to the aforementioned problems, and any other technical problems not mentioned herein will be clearly understood from the following description by those skilled in the art to which the present disclosure pertains.

According to a first aspect of the present disclosure, a method for controlling emergency stop of an autonomous vehicle includes receiving information about an emergency vehicle from the autonomous vehicle, obtaining situation information from the emergency vehicle, and determining whether to perform the emergency stop of the autonomous vehicle based on the obtained situation information.

In one implementation, the determining of whether to perform the emergency stop of the autonomous vehicle may include transmitting an emergency stop mode activation signal to the autonomous vehicle when the situation information is information indicating an emergency situation, and transmitting the emergency stop mode activation signal to the autonomous vehicle under agreement of an occupant in the autonomous vehicle when the situation information is information indicating a general situation.

In one implementation, the determining of whether to perform the emergency stop of the autonomous vehicle may further include performing, by the autonomous vehicle that has received the emergency stop mode activation signal, stop at a specified stop location.

In one implementation, the performing, by the autonomous vehicle, of the stop at the specified stop location may include continuing, by the autonomous vehicle, traveling to a destination when the specified stop location is not found.

In one implementation, the transmitting of the emergency stop mode activation signal to the autonomous vehicle under the agreement of the occupant in the autonomous vehicle may include guiding the occupant in the autonomous vehicle to communicate with a driver or a fellow passenger of the emergency vehicle when the situation information is the information indicating the general situation, obtaining an agreement of the occupant in the autonomous vehicle for the emergency stop, transmitting the emergency stop mode activation signal to the autonomous vehicle when the occupant in the autonomous vehicle agrees to the emergency stop, and transmitting destination information and interior image data of the autonomous vehicle to the emergency vehicle when the occupant in the autonomous vehicle does not agree to the emergency stop.

In one implementation, the information about the emergency vehicle may include at least one of a type of the emergency vehicle and image data obtained by capturing the emergency vehicle.

In one implementation, the receiving of the information about the emergency vehicle from the autonomous vehicle may include recognizing, by the autonomous vehicle, the emergency vehicle based on a color, a warning lamp, a text, an emblem, and a siren.

In one implementation, the receiving of the information about the emergency vehicle from the autonomous vehicle may include recognizing, by the autonomous vehicle, the emergency vehicle based on a color, a warning lamp, a text, an emblem, and a siren, and recognizing, by the autonomous vehicle, a stop request based on a stop instructing voice from the emergency vehicle.

According to a second aspect of the present disclosure, a method for controlling emergency stop of an autonomous vehicle includes receiving situation information and identification information of the autonomous vehicle from an emergency vehicle, and determining whether to perform the emergency stop of the autonomous vehicle based on the received situation information.

In one implementation, the determining of whether to perform the emergency stop of the autonomous vehicle may include transmitting an emergency stop mode activation signal to the autonomous vehicle when the situation information is information indicating an emergency situation, and transmitting the emergency stop mode activation signal to the autonomous vehicle under agreement of an occupant in the autonomous vehicle when the situation information is information indicating a general situation.

In one implementation, the determining of whether to perform the emergency stop of the autonomous vehicle may further include performing, by the autonomous vehicle that has received the emergency stop mode activation signal, stop at a specified stop location.

In one implementation, the performing, by the autonomous vehicle, of the stop at the specified stop location may include continuing, by the autonomous vehicle, traveling to a destination when the specified stop location is not found.

In one implementation, the transmitting of the emergency stop mode activation signal to the autonomous vehicle under the agreement of the occupant in the autonomous vehicle may include guiding the occupant in the autonomous vehicle to communicate with a driver or a fellow passenger of the emergency vehicle when the situation information is the information indicating the general situation, obtaining an agreement of the occupant in the autonomous vehicle for the emergency stop, transmitting the emergency stop mode activation signal to the autonomous vehicle when the occupant in the autonomous vehicle agrees to the emergency stop, and transmitting destination information and interior image data of the autonomous vehicle to the emergency vehicle when the occupant in the autonomous vehicle does not agree to the emergency stop.

In one implementation, identification information of the autonomous vehicle may include at least one of a number of the autonomous vehicle and a unique number of the autonomous vehicle.

According to a third aspect of the present disclosure, a method for controlling emergency stop of an autonomous vehicle includes recognizing, by the autonomous vehicle, a surrounding emergency vehicle, requesting, by the autonomous vehicle, approval for the emergency stop to a server, and determining, by the autonomous vehicle, whether to perform the emergency stop based on an approval result from the server.

In one implementation, the recognizing, by the autonomous vehicle, of the surrounding emergency vehicle may include recognizing the emergency vehicle based on a color, a warning lamp, a text, an emblem, and a siren.

In one implementation, the recognizing, by the autonomous vehicle, of the surrounding emergency vehicle may include recognizing the emergency vehicle based on a color, a warning lamp, a text, an emblem, and a siren, and recognizing a stop request based on a stop instructing voice from the emergency vehicle.

In one implementation, the determining of whether to perform the emergency stop based on the approval result from the server may include performing, by the autonomous vehicle, the emergency stop at a specified stop location when the approval is obtained from the server, and continuing, by the autonomous vehicle, traveling to a destination when the approval is not obtained from the server.

In one implementation, the performing, by the autonomous vehicle, of the emergency stop at the specified stop location may include displaying information indicating the emergency stop, flickering an emergency light, and turning on a door open permission button.

In one implementation, the continuing, by the autonomous vehicle, traveling to the destination may further include transmitting destination information and interior image data of the autonomous vehicle to the emergency vehicle.

According to a fourth aspect of the present disclosure, a method for controlling emergency stop of an autonomous vehicle includes recognizing, by the autonomous vehicle, a surrounding emergency vehicle, performing, by the autonomous vehicle, the emergency stop, and notifying, by the autonomous vehicle, a server the emergency stop of the autonomous vehicle.

DRAWINGS

The above features and advantages of the present disclosure will be more apparent from the following detailed description taken in conjunction with the accompanying drawings.

DETAILED DESCRIPTION

Figure 1:
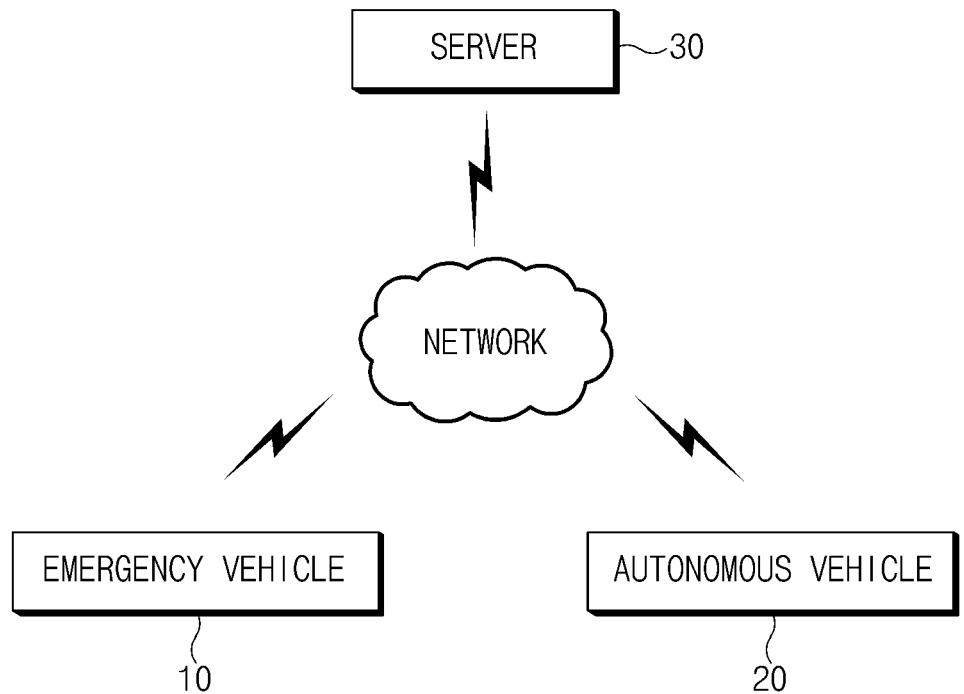
FIG. 1 is an example of an emergency stop control system of an autonomous vehicle in one form of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is an example of an emergency stop control system of an autonomous vehicle to which each embodiment of the present disclosure is applied.

As shown in FIG. 1, an emergency stop control system of an autonomous vehicle to which each embodiment of the present disclosure is applied may include an emergency vehicle 10, an autonomous vehicle 20, and a server 30.

The emergency vehicle 10 includes a police car, a fire truck, an ambulance, and the like, and means a vehicle that operates to comply with regulations prescribed by law. Such emergency vehicle 10 is a vehicle that is driven by a driver, not an autonomous vehicle.

The autonomous vehicle 20 includes both a privately owned autonomous vehicle and a commercial autonomous vehicle owned by a businessperson. However, in each embodiment of the present disclosure, the commercial autonomous vehicle owned by the businessperson will be described as an example.

When there is a vehicle that is continuously sensed within a certain distance (hereinafter, referred to as a following vehicle), the autonomous vehicle 20 may record an image and a sound of the following vehicle in a memory (not shown).

The autonomous vehicle 20 may output the image and the sound of the following vehicle and provide the image and the sound to an occupant.

The autonomous vehicle 20 may transmit the image and the sound of the following vehicle recorded in the memory to the server 30.

The server 30 is able to communicate with the emergency vehicle 10 and the autonomous vehicle 20, and particularly has a remote control right for the autonomous vehicle 20. As an example, the server 30 may operate the autonomous vehicle 20 in an emergency stop mode by transmitting an emergency stop mode activation signal to the autonomous vehicle 20. For reference, the emergency stop mode means a function in which the traveling autonomous vehicle 20 determines a safe stop location by itself and stops at the determined stop location. In this connection, the safe stop location is a specified stop location, which means a location that does not adversely affect travel of a subsequent vehicle, such as a shoulder of a road, a shelter, an empty space, a rest area, and the like.

Figure 2:
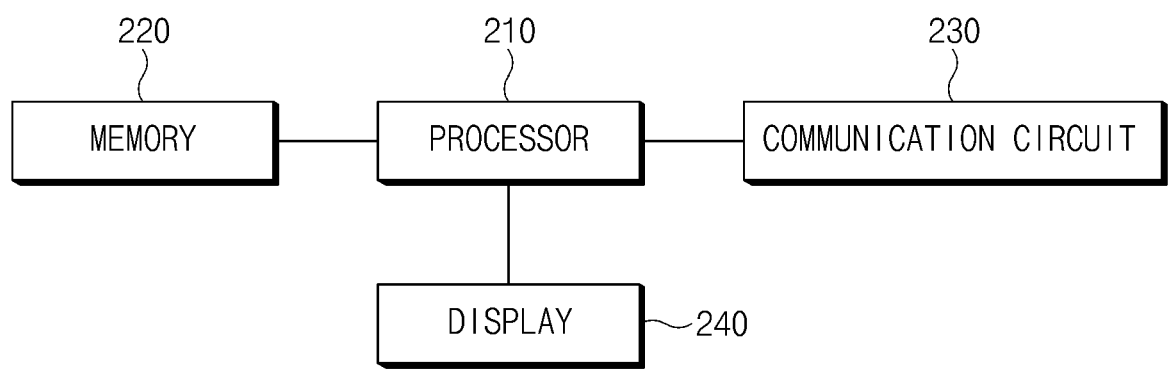
FIG. 2 is a configuration diagram of a server disposed in an emergency stop control system of an autonomous vehicle in one form of the present disclosure.

FIG. 2 is a configuration diagram of a server disposed in an emergency stop control system of an autonomous vehicle to which each embodiment of the present disclosure is applied.

As shown in FIG. 2, the server 30 disposed in the emergency stop control system of the autonomous vehicle to which each embodiment of the present disclosure is applied may include a processor 210, a memory 220, and a communication circuit 230. In addition, the server 30 may further include a display 240 to perform an interface with a user.

The processor 210 may control overall operations of the server 30. The processor 210 may include a single processor core (single core) or a plurality of processor cores. For example, the processor 210 may include a multi-core such as a dual-core, a quad-core, a hexa-core, and the like. According to embodiments, the processor 210 may further include a cache memory located inside or outside the processor 210. According to embodiments, the processor 210 may be composed of one or more processors. For example, the processor 210 may include at least one of an application processor, a communication processor, and a graphical processing unit (GPU).

All or some of the processors of the processor 210 may be electrically or operatively coupled or connected to other components (e.g., the memory 220, the communication circuit 230, or the display 240) in the server 30. The processor 210 may receive commands of other components of the server 30, interpret the received commands, and perform a calculation or process data in response to the interpreted commands. The processor 210 may interpret and process a message, data, an instruction, or a signal received from the memory 220, the communication circuit 230, or the display 240. The processor 210 may generate a new message, data, instruction, or signal based on the received message, data, instruction, or signal. The processor 210 may provide the processed or generated message, data, instruction, or signal to the memory 220, the communication circuit 230, or the display 240.

The processor 210 may process data or a signal generated in a program. For example, the processor 210 may request an instruction, data, or a signal to the memory 220 to execute or control the program. The processor 210 may record (or store) or update the instruction, the data, or the signal of the memory 220 to execute or control the program.

The memory 220 may store an instruction, a control instruction code, control data, or user data to control the server 30. For example, the memory 220 may include at least one of an application program, an operating system (OS), middleware, and a device driver.

The memory 220 may include at least one of a volatile memory and a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read only memory (ROM), a programmable ROM (PROM), an electrically programmable ROM (EPROM), an electrically erasable programmable ROM (EEPROM), a flash memory, and the like.

The memory 220 may further include a non-volatile memory medium such as a hard disk drive (HDD), a solid state disk (SSD), an embedded multi media card (eMMC), and a universal flash storage (UFS).

The memory 220 may store various logics, algorithms, and programs required in a process of recognizing a stop request from the emergency vehicle, determining whether a current situation is an emergency situation or a general situation, and performing a procedure corresponding to each situation.

Such memory 220 may further store a logic for obtaining an agreement of the occupant of the autonomous vehicle 20 for the emergency stop in the general situation.

The communication circuit 230 may support establishment of a wireless communication connection with the emergency vehicle 10 and the autonomous vehicle 20, and communication through the established connection. Such communication circuit 230 may include, for example, a cellular communication circuit, a short-range wireless communication circuit, or a global navigation satellite system (GNSS) communication circuit. The communication circuit 230 may communicate with the emergency vehicle 10 and the autonomous vehicle 20 through a short-range communication network such as a Bluetooth, a WiFi direct, or an infrared data association (IrDA), or a telecommunication network such as a cellular network, an Internet, or a computer network using one of those. The various types of communication circuits described above may be implemented as one chip or may be implemented as separate chips.

The display 240 may output content, data, or a signal. The display 240 may display image data processed by the processor 210. The display 240 may be formed as an integrated touch screen by being coupled to a plurality of touch sensors (not shown) capable of receiving a touch input or the like. When the display 240 is formed as the touch screen, the plurality of touch sensors may be disposed on the display 240 or beneath the display 240.

Figure 3:
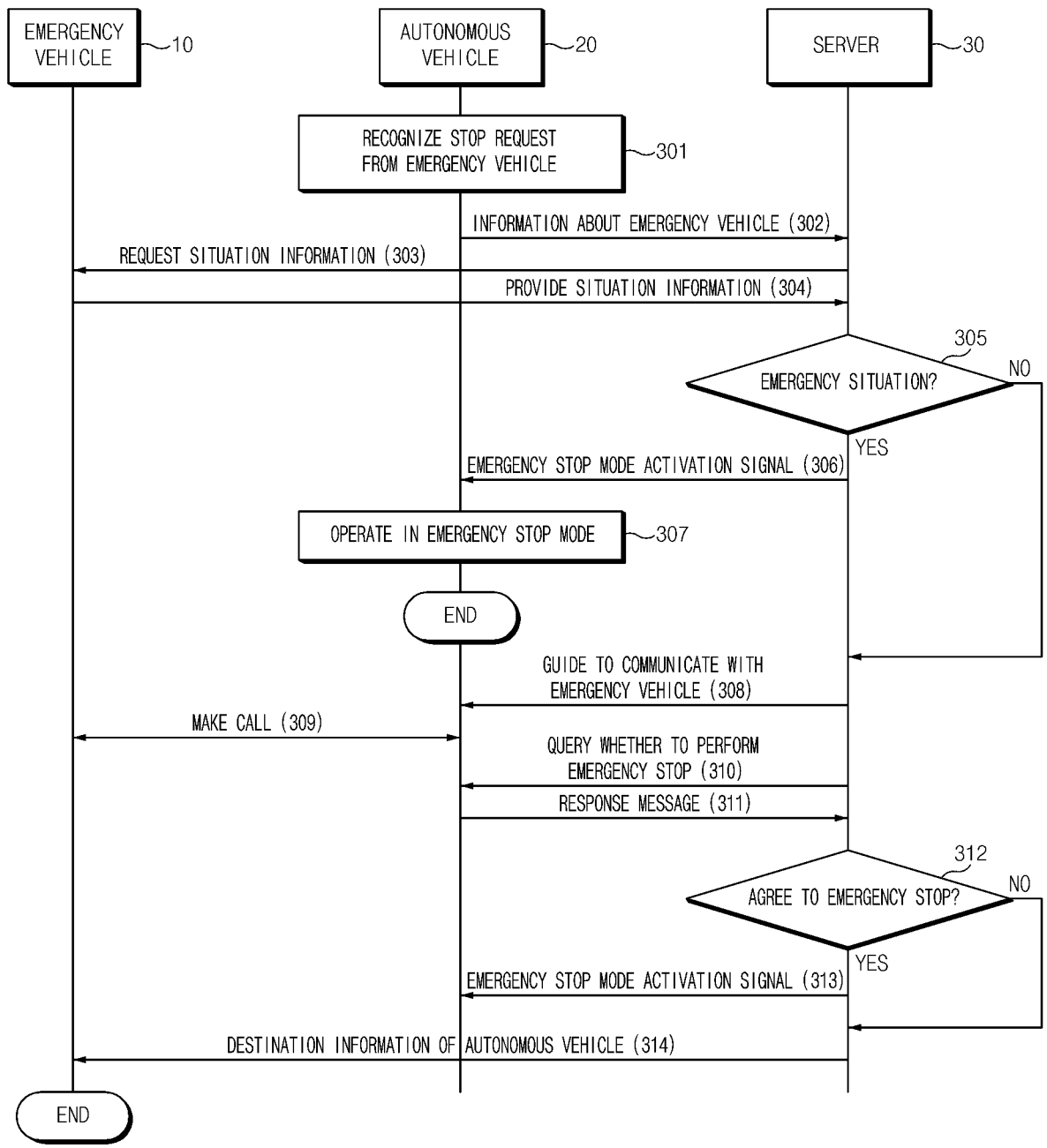
FIG. 3 is a flowchart of an emergency stop control method of an autonomous vehicle according to a first embodiment of the present disclosure.

FIG. 3 is a flowchart of an emergency stop control method of an autonomous vehicle according to a first embodiment of the present disclosure.

The autonomous vehicle 20 may pick up a passenger and travel to a destination. In this connection, the emergency vehicle may request the stop of the autonomous vehicle 20. The emergency vehicle 10 may request the stop of the autonomous vehicle 20 using the wireless communication. However, in a first embodiment of the present disclosure, a case in which a driver or a fellow passenger of the emergency vehicle 10 requests the stop of the autonomous vehicle 20 by voice through a loudspeaker will be described. For example, the driver or the fellow passenger of the emergency vehicle 10 may utter "A vehicle of number 3456, stop!" through the loudspeaker.

In a process "301", the autonomous vehicle 20 may recognize the emergency vehicle 10 through various sensors (e.g., a front/rear/left/right camera, an ultrasonic sensor, a radar sensor, a lidar sensor, a GPS receiver, a microphone, and the like), and recognize the stop request from the emergency vehicle 10 by identifying an uttered content of the driver or the fellow passenger of the emergency vehicle 10. For example, the autonomous vehicle 20 may recognize the emergency vehicle 10 using external features (a color, a warning lamp, a text, an emblem, and the like) of the emergency vehicle 10. In another example, the autonomous vehicle 20 may recognize the emergency vehicle 10 using the external features (the color, the warning lamp, the text, the emblem, and the like) of the emergency vehicle 10, and recognize the stop request from the emergency vehicle using a sound (a siren sound, a stop instructing voice of an occupant of the emergency vehicle, and the like).

In a process "302", the autonomous vehicle 20 may transmit information about the emergency vehicle 10 recognized in the process "301" to the server 30. For example, the information about the emergency vehicle 10 may be information indicating whether the emergency vehicle 10 is a police car, a fire engine, or an ambulance. In this connection, the information about the emergency vehicle 10 may further include image data of the captured emergency vehicle 10. Such image data of the emergency vehicle 10 may be stored in the server 30, and an administrator of the server 30 may utilize the image data of the emergency vehicle 10 as event information for the autonomous vehicle 20. In another example, the information about the emergency vehicle 10 may be information necessary to recognize the emergency vehicle 10. In this case, the recognition of the emergency vehicle 10 may be performed by the server 30, and the server 30 may transmit the recognized result to the autonomous vehicle 20.

The stop request from the emergency vehicle 10 may be a request based on the emergency situation or a request based on the general situation. In the first embodiment of the present disclosure, each situation may be identified and distinguished, and a process suitable for each situation may be performed.

The server 30 may request situation information to the emergency vehicle 10 through the wireless communication (303). That is, the server 30 may query the emergency vehicle 10 whether the stop request for the autonomous vehicle 20 is the stop request based on the emergency situation or the stop request based on the general situation.

In a process "304", the server 30 may receive the situation information from the emergency vehicle 10. In this connection, a display (not shown) disposed in the emergency vehicle 10 may display the situation information request from the server 30 to allow the driver or the fellow passenger of the emergency vehicle 10 to identify the situation information request, and display a button for an emergency situation input and a button for a general situation input. Therefore, the driver or the fellow passenger of the emergency vehicle 10 may provide the situation information to the server 30 by touching the emergency situation button or the general situation button. As an example, the emergency situation may include a case in which a criminal is aboard the autonomous vehicle 20, a case in which an emergency patient occurs in the autonomous vehicle 20, and the like.

The server 30 may determine whether the situation information received from the emergency vehicle 10 is information indicating the emergency situation or information indicating the general situation (305).

In case of the information indicating the emergency situation, the server 30 transmits the emergency stop mode activation signal to the autonomous vehicle 20 (306). Then, the autonomous vehicle 20 operates in the emergency stop mode in response to the emergency stop mode activation signal received from the server 30 (307).

In the process "307", the autonomous vehicle 20 may search for the safe stop location and stop, display that the stop is the emergency stop through the display when stopping, flicker an emergency light, and turn on a door open permission button to enable the occupant to deactivate a locked state of a door. In this connection, the autonomous vehicle 20 may travel to the destination without stopping when the safe stop location is not searched.

In a process "308", in case of the information indicating the general situation, the server 30 may guide the autonomous vehicle 20 to communicate (e.g., exchange a text message) with the emergency vehicle 10. As an example, the server 30 may query the occupant of the autonomous vehicle 20 whether the occupant wants to exchange the text message (e.g., a KakaoTalk, and the like) with the driver or the fellow passenger of the emergency vehicle 10.

In the process "308", in case of the information indicating the general situation, the server 30 may guide the autonomous vehicle 20 to communicate with (e.g., make a call to) the emergency vehicle 10. As an example, the server 30 may query the occupant of the autonomous vehicle 20 whether the occupant wants to make a call (e.g., a voice call or a video call) to the driver or the fellow passenger of the emergency vehicle 10. In this connection, a display (not shown) disposed in the autonomous vehicle 20 may display a phrase "Do you want to make a call to the driver or the fellow passenger of the emergency vehicle 10?", and may also display a "Yes" button and a "No" button. The occupant of the autonomous vehicle 20 may notify the server 30 whether or not to make a call to the driver or the fellow passenger of the emergency vehicle 10 by touching the "Yes" button or the "No" button. In another example, when there is no occupant in the autonomous vehicle 20, the server 30 may perform the process "306" without querying whether to make a call to the driver or the fellow passenger of the emergency vehicle 10.

When the occupant of the autonomous vehicle 20 touches the "Yes" button in the process "308", that is, when the occupant of the autonomous vehicle 20 accepts the call with the driver or the fellow passenger of the emergency vehicle 10, the server 30 may set a channel between the emergency vehicle 10 and the autonomous vehicle 20 (309). When the channel (a voice channel or a video channel) is established between the emergency vehicle 10 and the autonomous vehicle 20, the occupant of the autonomous vehicle 20 may make a call with the driver or the fellow passenger of the emergency vehicle 10.

In a process "310", the server 30 may query the occupant of the autonomous vehicle 20 whether to perform the emergency stop. In this connection, the display of the autonomous vehicle 20 may display a phrase "Are you agreeing to the emergency stop?", and also may display an "agree" button and a "disagree" button. The passenger of the autonomous vehicle 20 may notify the server 30 whether or not agreeing to the emergency stop by touching the "agree" button or the "disagree" button. That is, the server 30 may receive a response message from the autonomous vehicle 20 (311).

When a content of the response message received from the autonomous vehicle 20 includes agreement to the emergency stop (312), the server 30 may transmit the emergency stop mode activation signal to the autonomous vehicle 20 (313). When the content of the response message received from the autonomous vehicle 20 includes disagreement to the emergency stop (312), the server 30 may no longer get involved in the travel of the autonomous vehicle 20, and may provide destination information of the autonomous vehicle 20 to the emergency vehicle 10 (314). In this connection, the server 30 may further provide image data of a captured interior of the autonomous vehicle 20 to the emergency vehicle 10. Such interior image data and destination information of the autonomous vehicle 20 may be provided by the autonomous vehicle 20 directly to the emergency vehicle 10. For reference, because the autonomous vehicle 20 is operated under management of the server 30, the server 30 may obtain the interior image of the autonomous vehicle 20 at any time. That is, the autonomous vehicle 20 may transmit the interior image data to the server 30.

Figure 4:
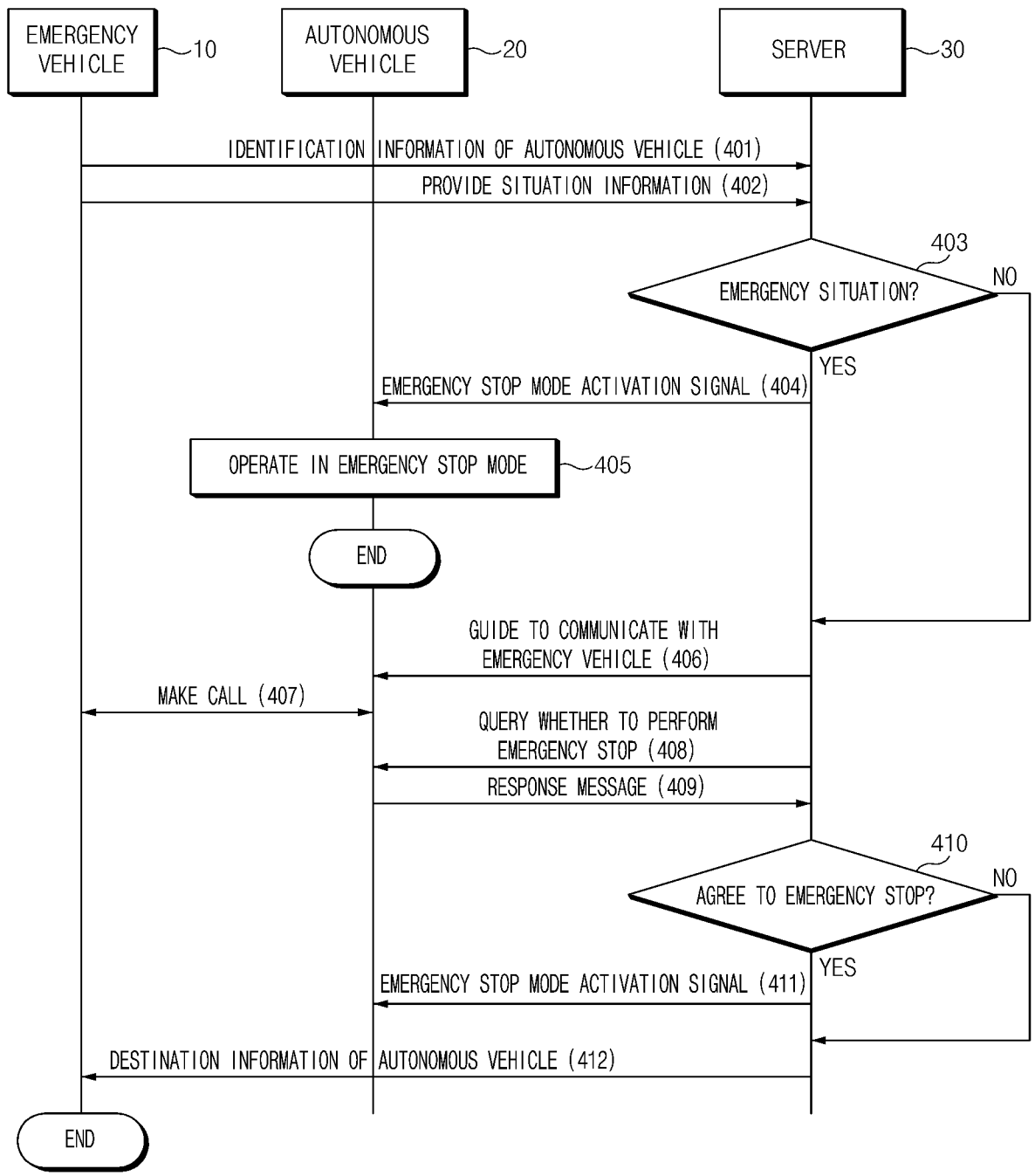
FIG. 4 is a flowchart of an emergency stop control method of an autonomous vehicle according to a second embodiment of the present disclosure.

FIG. 4 is a flowchart of an emergency stop control method of an autonomous vehicle according to a second embodiment of the present disclosure.

The autonomous vehicle 20 may pick up the passenger and travel to the destination. The emergency vehicle 10 may request the stop of the autonomous vehicle 20 to the server 30 (401). In this connection, the emergency vehicle 10 may transmit identification information (e.g., a vehicle number, a vehicle unique number, or the like) of the autonomous vehicle 20 to the server 30.

The emergency vehicle 10 may transmit the situation information to the server 30 (402). In this connection, the display (not shown) disposed in the emergency vehicle 10 may display the button for the emergency situation input and the button for the general situation input. Therefore, the driver or the fellow passenger of the emergency vehicle 10 may provide the situation information to the server 30 by touching the emergency situation button or the general situation button. As an example, the emergency situation may include the case in which the criminal is aboard the autonomous vehicle 20, the case in which the emergency patient occurs in the autonomous vehicle 20, and the like.

The server 30 may determine whether the situation information received from the emergency vehicle 10 is the information indicating the emergency situation or the information indicating the general situation (403).

In case of the information indicating the emergency situation, the server 30 transmits the emergency stop mode activation signal to the autonomous vehicle 20 (404). Then, the autonomous vehicle 20 operates in the emergency stop mode in response to the emergency stop mode activation signal received from the server 30 (405).

In the process "405", the autonomous vehicle 20 may search for the safe stop location and stop, display that the stop is the emergency stop through the display when stopping, flicker the emergency light, and turn on the door open permission button to enable the occupant to deactivate the locked state of the door.

In a process "406", in case of the information indicating the general situation, the server 30 may guide the autonomous vehicle 20 to communicate (e.g., exchange the text message) with the emergency vehicle 10. As an example, the server 30 may query the occupant of the autonomous vehicle 20 whether the occupant wants to exchange the text message with the driver or the fellow passenger of the emergency vehicle 10.

In the process "406", in case of the information indicating the general situation, the server 30 may guide the autonomous vehicle 20 to communicate with (e.g., make a call to) the emergency vehicle 10. As an example, the server 30 may query the occupant of the autonomous vehicle 20 whether the occupant wants to make a call (e.g., the voice call or the video call) to the driver or the fellow passenger of the emergency vehicle 10. In this connection, the display (not shown) disposed in the autonomous vehicle 20 may display the phrase "Do you want to make a call to the driver or the fellow passenger of the emergency vehicle 10?", and may also display the "Yes" button and the "No" button. The occupant of the autonomous vehicle 20 may notify the server 30 whether or not to make a call to the driver or the fellow passenger of the emergency vehicle 10 by touching the "Yes" button or the "No" button. In another example, when there is no occupant in the autonomous vehicle 20, the server 30 may perform the process "404" without querying whether to make a call to the driver or the fellow passenger of the emergency vehicle 10.

When the occupant of the autonomous vehicle 20 touches the "Yes" button in the process "406", that is, when the occupant of the autonomous vehicle 20 accepts the call with the driver or the fellow passenger of the emergency vehicle 10, the server 30 may set the channel between the emergency vehicle 10 and the autonomous vehicle 20 (407). When the channel (the voice channel or the video channel) is established between the emergency vehicle 10 and the autonomous vehicle 20, the occupant of the autonomous vehicle 20 may make a call with the driver or the fellow passenger of the emergency vehicle 10.

In a process "408", the server 30 may query the occupant of the autonomous vehicle 20 whether to perform the emergency stop. In this connection, the display of the autonomous vehicle 20 may display the phrase "Are you agreeing to the emergency stop?", and also may display the "agree" button and the "disagree" button. The passenger of the autonomous vehicle 20 may notify the server 30 whether or not agreeing to the emergency stop by touching the "agree" button or the "disagree" button. That is, the server 30 may receive the response message from the autonomous vehicle 20 (409).

When the content of the response message received from the autonomous vehicle 20 includes the agreement to the emergency stop (410), the server 30 may transmit the emergency stop mode activation signal to the autonomous vehicle 20 (411). When the content of the response message received from the autonomous vehicle 20 includes the disagreement to the emergency stop (410), the server 30 may no longer get involved in the travel of the autonomous vehicle 20, and may provide the destination information of the autonomous vehicle 20 to the emergency vehicle 10 (412). In this connection, the server 30 may further provide the image data of the captured interior of the autonomous vehicle 20 to the emergency vehicle 10. Such interior image data and destination information of the autonomous vehicle 20 may be provided by the autonomous vehicle 20 directly to the emergency vehicle 10. For reference, because the autonomous vehicle 20 is operated under the management of the server 30, the server 30 may obtain the interior image of the autonomous vehicle 20 at any time. That is, the autonomous vehicle 20 may transmit the interior image data to the server 30.

Figure 5:
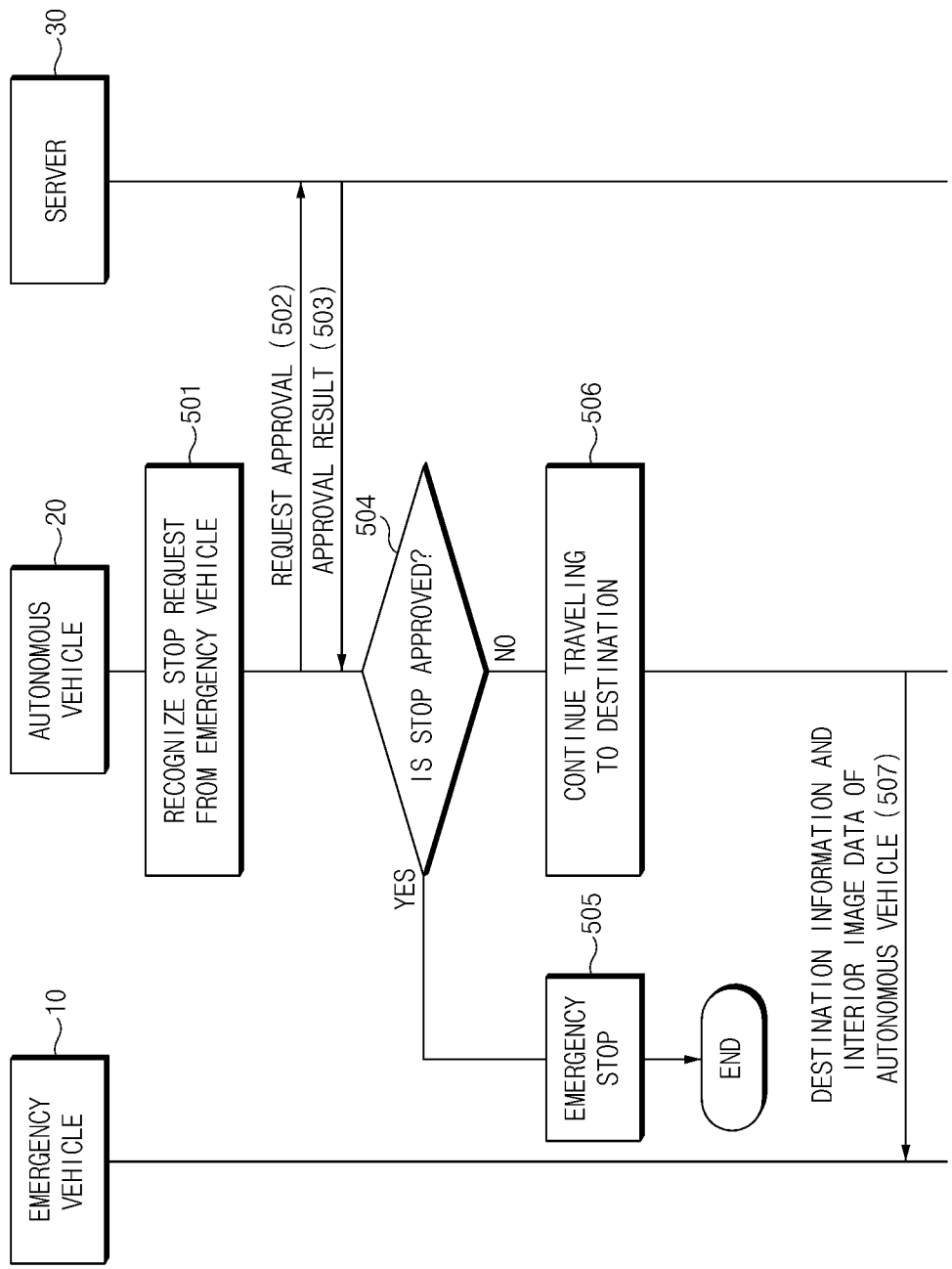
FIG. 5 is a flowchart of an emergency stop control method of an autonomous vehicle according to a third embodiment of the present disclosure.

FIG. 5 is a flowchart of an emergency stop control method of an autonomous vehicle according to a third embodiment of the present disclosure.

The autonomous vehicle 20 may be traveling on a road to pick up the passenger as a commercial vehicle for transporting the passenger, or may be traveling to the destination while loading a cargo as a commercial vehicle for transporting the cargo. In this connection, the emergency vehicle 10 may request the stop of the autonomous vehicle 20.

In a process "501", the autonomous vehicle 20 may recognize the emergency vehicle 10 through the various sensors (e.g., the front/rear/left/right camera, the ultrasonic sensor, the radar sensor, the lidar sensor, the GPS receiver, the microphone, and the like). Further, the autonomous vehicle 20 may recognize the stop request from the emergency vehicle 10 by identifying the uttered content of the driver or the fellow passenger of the emergency vehicle 10. For example, the autonomous vehicle 20 may recognize the emergency vehicle 10 using the external features (the color, the warning lamp, the text, the emblem, and the like) of the emergency vehicle 10. In another example, the autonomous vehicle 20 may recognize the emergency vehicle 10 using the external features (the color, the warning lamp, the text, the emblem, and the like) of the emergency vehicle 10, and recognize the stop request from the emergency vehicle using the sound (the siren sound, the stop instructing voice of the occupant of the emergency vehicle, and the like).

The autonomous vehicle 20 may request the server 30 to approve whether to stop (502), and receive a result from the server 30 (503).

The autonomous vehicle 20 may perform the emergency stop when the stop is approved (505) and, may continue traveling to the destination when the stop is not approved (506). In this connection, the autonomous vehicle 20 may transmit the destination information and the interior image data to the emergency vehicle 10 (507). Such destination information and interior image data may be transmitted to the emergency vehicle 10 by the server 30. For reference, because the autonomous vehicle 20 is operated under the management of the server 30, the server 30 may obtain the interior image of the autonomous vehicle 20 at any time. That is, the autonomous vehicle 20 may transmit the interior image data to the server 30.

Figure 6:
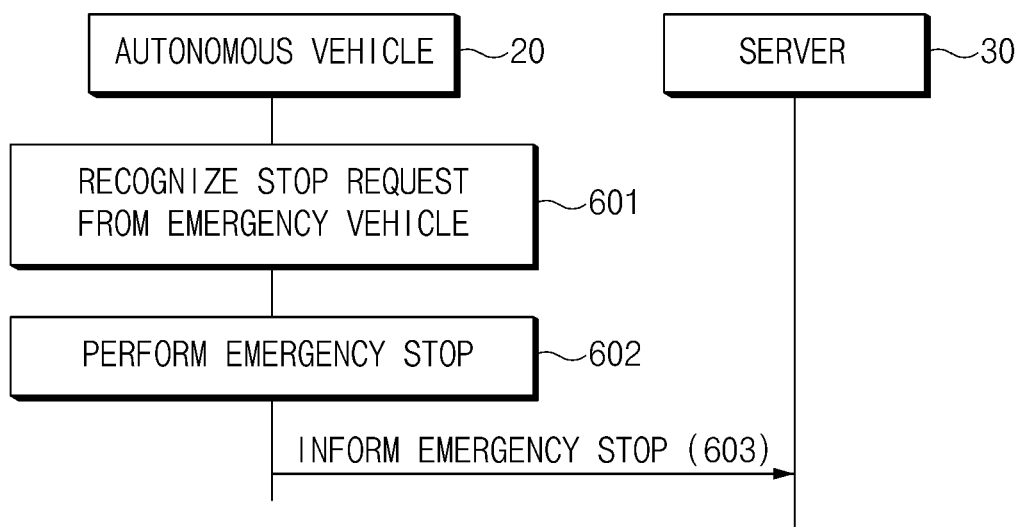
FIG. 6 is a flowchart of an emergency stop control method of an autonomous vehicle according to a fourth embodiment of the present disclosure.

FIG. 6 is a flowchart of an emergency stop control method of an autonomous vehicle according to a fourth embodiment of the present disclosure.

In a process "601", the autonomous vehicle 20 may recognize the emergency vehicle 10 through the various sensors (e.g., the front/rear/left/right camera, the ultrasonic sensor, the radar sensor, the lidar sensor, the GPS receiver, the microphone, and the like). Further, the autonomous vehicle 20 may recognize the stop request from the emergency vehicle 10 by identifying the uttered content of the driver or the fellow passenger of the emergency vehicle 10. For example, the autonomous vehicle 20 may recognize the emergency vehicle 10 using the external features (the color, the warning lamp, the text, the emblem, and the like) of the emergency vehicle 10. In another example, the autonomous vehicle 20 may recognize the emergency vehicle 10 using the external features (the color, the warning lamp, the text, the emblem, and the like) of the emergency vehicle 10, and recognize the stop request from the emergency vehicle using the sound (the siren sound, the stop instructing voice of the occupant of the emergency vehicle, and the like).

In the process "601", the autonomous vehicle 20 may be requested for the emergency stop through the wireless communication from the emergency vehicle 10.

Then, the autonomous vehicle 20 may perform the emergency stop (602). In this connection, the autonomous vehicle 20 may stop at the safe stop location. In this connection, the safe stop location is the specified stop location, which means the location that does not adversely affect the travel of the subsequent vehicle, such as the shoulder of the road, the shelter, the empty space, the rest area, and the like.

Thereafter, the autonomous vehicle 20 may inform the emergency stop to the server 30 (603).

Figure 7:
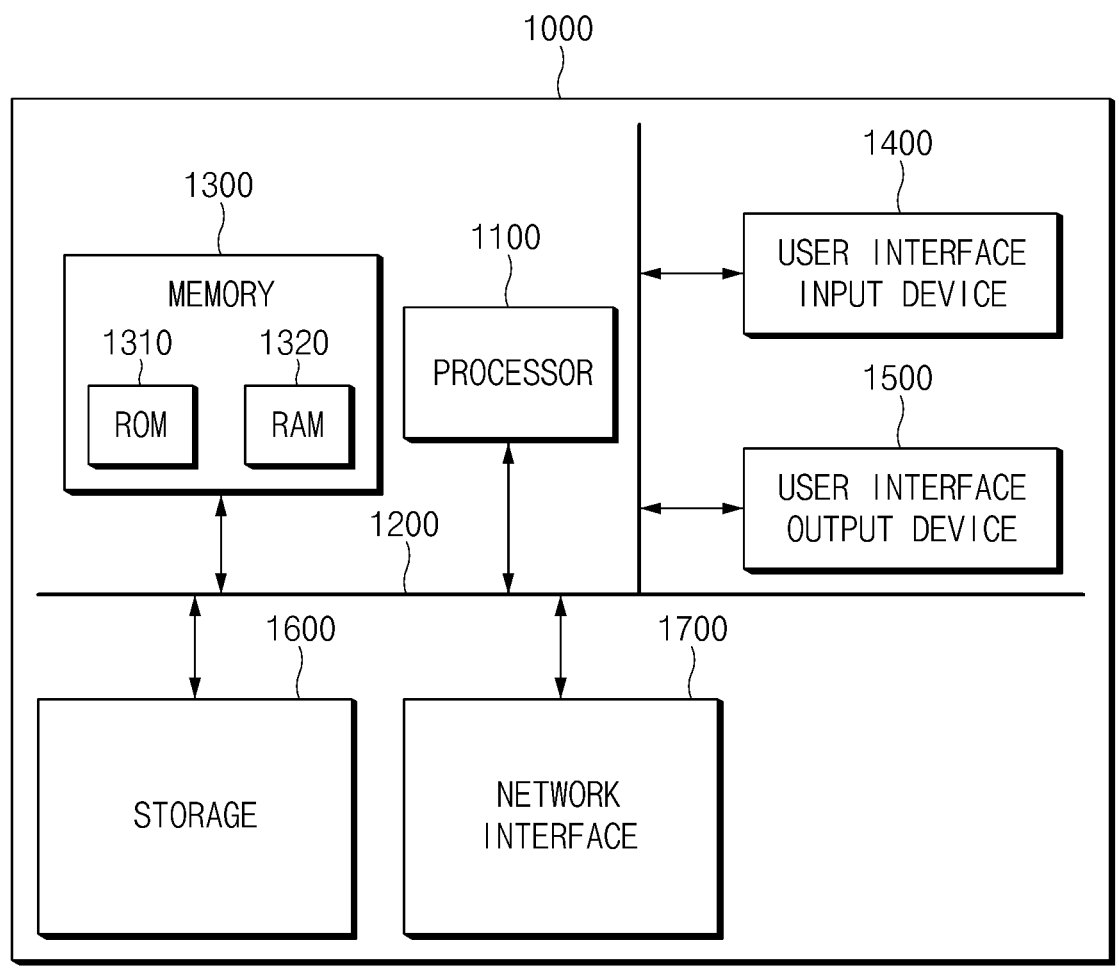
FIG. 7 is a block diagram showing a computing system in which an emergency stop control method of an autonomous vehicle according to each embodiment of the present disclosure is implemented.

FIG. 7 is a block diagram showing a computing system in which an emergency stop control method of an autonomous vehicle according to each embodiment of the present disclosure is implemented.

Referring to FIG. 7, the emergency stop control method of the autonomous vehicle according to each embodiment of the present disclosure described above may also be implemented through a computing system. A computing system 1000 may include at least one processor 1100, a memory 1300, a user interface input device 1400, a user interface output device 1500, storage 1600, and a network interface 1700 connected via a system bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The method for controlling the emergency stop of the autonomous vehicle may recognize the stop request from the emergency vehicle, determine whether the current situation is the emergency situation or the general situation, and perform the procedure corresponding to each situation to stop the autonomous vehicle based on each situation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for controlling an emergency stop of an autonomous vehicle, the method comprising:
    receiving, by a server, information about an emergency vehicle from the autonomous vehicle;
    obtaining, by the server, situation information from the emergency vehicle; and
    determining, by the server, whether to perform the emergency stop of the autonomous vehicle based on the obtained situation information,
    wherein the determination of whether to perform the emergency stop of the autonomous vehicle includes:
        transmitting an emergency stop mode activation signal to the autonomous vehicle when the situation information indicates an emergency situation; and
        transmitting the emergency stop mode activation signal to the autonomous vehicle under agreement of an occupant in the autonomous vehicle when the situation information indicates a general situation,
    wherein the transmitting of the emergency stop mode activation signal to the autonomous vehicle under the agreement of the occupant in the autonomous vehicle includes:
        guiding the occupant in the autonomous vehicle to communicate with a driver or a fellow passenger of the emergency vehicle when the situation information indicates the general situation,
        obtaining the agreement of the occupant in the autonomous vehicle for the emergency stop,
        transmitting the emergency stop mode activation signal to the autonomous vehicle when the occupant in the autonomous vehicle agrees to the emergency stop, and
        transmitting destination information and interior image data of the autonomous vehicle to the emergency vehicle when the occupant in the autonomous vehicle does not agree to the emergency stop.

2. The method of claim 1, wherein the determination of whether to perform the emergency stop of the autonomous vehicle further includes:
    performing, by the autonomous vehicle that has received the emergency stop mode activation signal, a stop at a specified stop location.

3. The method of claim 2, wherein the performing, by the autonomous vehicle, of the stop at the specified stop location includes:
    continuing, by the autonomous vehicle, traveling to a destination when the specified stop location is not found.

4. The method of claim 1, wherein the information about the emergency vehicle includes at least one of a type of the emergency vehicle or image data obtained by capturing an image of the emergency vehicle.

5. The method of claim 1, wherein the receiving of the information about the emergency vehicle from the autonomous vehicle includes:
    recognizing, by the autonomous vehicle, the emergency vehicle based on a color, a warning lamp, a text, an emblem, and a siren.

6. The method of claim 1, wherein the receiving of the information about the emergency vehicle from the autonomous vehicle includes:
    recognizing, by the autonomous vehicle, the emergency vehicle based on a color, a warning lamp, a text, an emblem, and a siren; and
    recognizing, by the autonomous vehicle, a stop request based on a stop instructing voice from the emergency vehicle.

7. A method for controlling an emergency stop of an autonomous vehicle, the method comprising:
    receiving situation information and identification information of the autonomous vehicle from an emergency vehicle; and
    determining whether to perform the emergency stop of the autonomous vehicle based on the received situation information,
    wherein the determination of whether to perform the emergency stop of the autonomous vehicle includes:
        transmitting an emergency stop mode activation signal to the autonomous vehicle when the situation information indicates an emergency situation; and
        transmitting the emergency stop mode activation signal to the autonomous vehicle under agreement of an occupant in the autonomous vehicle when the situation information indicates a general situation;
    wherein the transmitting of the emergency stop mode activation signal to the autonomous vehicle under the agreement of the occupant in the autonomous vehicle includes:
        guiding the occupant in the autonomous vehicle to communicate with a driver or a fellow passenger of the emergency vehicle when the situation information indicates the general situation;
        obtaining the agreement of the occupant in the autonomous vehicle for the emergency stop;
        transmitting the emergency stop mode activation signal to the autonomous vehicle when the occupant in the autonomous vehicle agrees to the emergency stop; and
        transmitting destination information and interior image data of the autonomous vehicle to the emergency vehicle when the occupant in the autonomous vehicle does not agree to the emergency stop.

8. The method of claim 7, wherein the identification information of the autonomous vehicle includes at least one of a number of the autonomous vehicle or a unique number of the autonomous vehicle.

9. A method for controlling an emergency stop of an autonomous vehicle, the method comprising:
recognizing, by the autonomous vehicle, a surrounding emergency vehicle;
requesting, by the autonomous vehicle, approval for the emergency stop to a server; and
determining, by the autonomous vehicle, whether to perform the emergency stop based on an approval result from the server;
wherein the determination of whether to perform the emergency stop based on the approval result from the server includes:
performing, by the autonomous vehicle, the emergency stop at a specified stop location when the approval is obtained from the server; and
continuing, by the autonomous vehicle, traveling to a destination when the approval is not obtained from the server,
wherein the continuing traveling to the destination further includes transmitting destination information and interior image data of the autonomous vehicle to the emergency vehicle.

10. The method of claim 9, wherein the recognizing of the surrounding emergency vehicle includes:
recognizing the emergency vehicle based on a color, a warning lamp, a text, an emblem, and a siren.

11. The method of claim 9, wherein the recognizing of the surrounding emergency vehicle includes:
recognizing the emergency vehicle based on a color, a warning lamp, a text, an emblem, and a siren; and
recognizing a stop request based on a stop instructing voice from the emergency vehicle.

12. The method of claim 9, wherein the performing of the emergency stop at the specified stop location includes:
displaying information indicating the emergency stop;
flickering an emergency light; and
turning on a door open permission button.

* * * * *